US010599434B1

(12) United States Patent
Barrett et al.

(10) Patent No.: US 10,599,434 B1
(45) Date of Patent: Mar. 24, 2020

(54) PROVIDING TOUCH GESTURE RECOGNITION TO A LEGACY WINDOWED SOFTWARE APPLICATION (71) Applicant: RAYTHEON COMPANY, Waltham, MA (US)

(72) Inventors: Jack Barrett, Tucson, AZ (US); Eisen Montalvo-Ruiz, Tucson, AZ (US); Jon E. Peoble, Tucson, AZ (US); Ruston K. Keeton, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/220,223

(22) Filed: Dec. 14, 2018

(51) Int. Cl.
G06F 9/54 (2006.01)
G06F 9/30 (2018.01)
G06F 9/445 (2018.01)
G06F 3/0488 (2013.01)

(52) U.S. Cl.
CPC ...... G06F 9/30174 (2013.01); G06F 3/04883 (2013.01); G06F 9/44526 (2013.01)

(58) Field of Classification Search
CPC ........................................................ G06F 9/541

USPC ........................................................... 719/328
See application file for complete search history.

(56) References Cited

U.S. PATENT DOCUMENTS

| 7,180,531 | B2* | 2/2007 | Gery | G06F 9/451 |
| | | | | 345/698 |
| 8,843,827 | B2* | 9/2014 | Koo | G06F 3/0484 |
| | | | | 715/736 |
| 9,721,366 | B2* | 8/2017 | Goard | G06T 11/206 |
| 2016/0209968 | A1* | 7/2016 | Taylor | G06F 3/0416 |

* cited by examiner

Primary Examiner — Andy Ho
(74) Attorney, Agent, or Firm — Burns & Levinson, LLP; Joseph M. Maraia (57) ABSTRACT An architecture for providing a legacy software application with touch gesture recognition includes an overlay software application and a converter plug-in software application. The overlay application is configured to intercept and detect touch gestures and provide gesture information to the converter plug-in application. The converter plug-in application converts the detected gesture information into data that the legacy application can use. The converted data is provided to the legacy application via an API. The touch gesture recognition is essentially unnoticeable by the user as the overlay application is positioned over the legacy application and is effectively transparent.

20 Claims, 5 Drawing Sheets

PROVIDING TOUCH GESTURE RECOGNITION TO A LEGACY WINDOWED SOFTWARE APPLICATION

FIELD OF THE DISCLOSURE

The disclosure relates, generally, to providing touch gesture recognition to a legacy windowed application.

BACKGROUND

Figure 1:
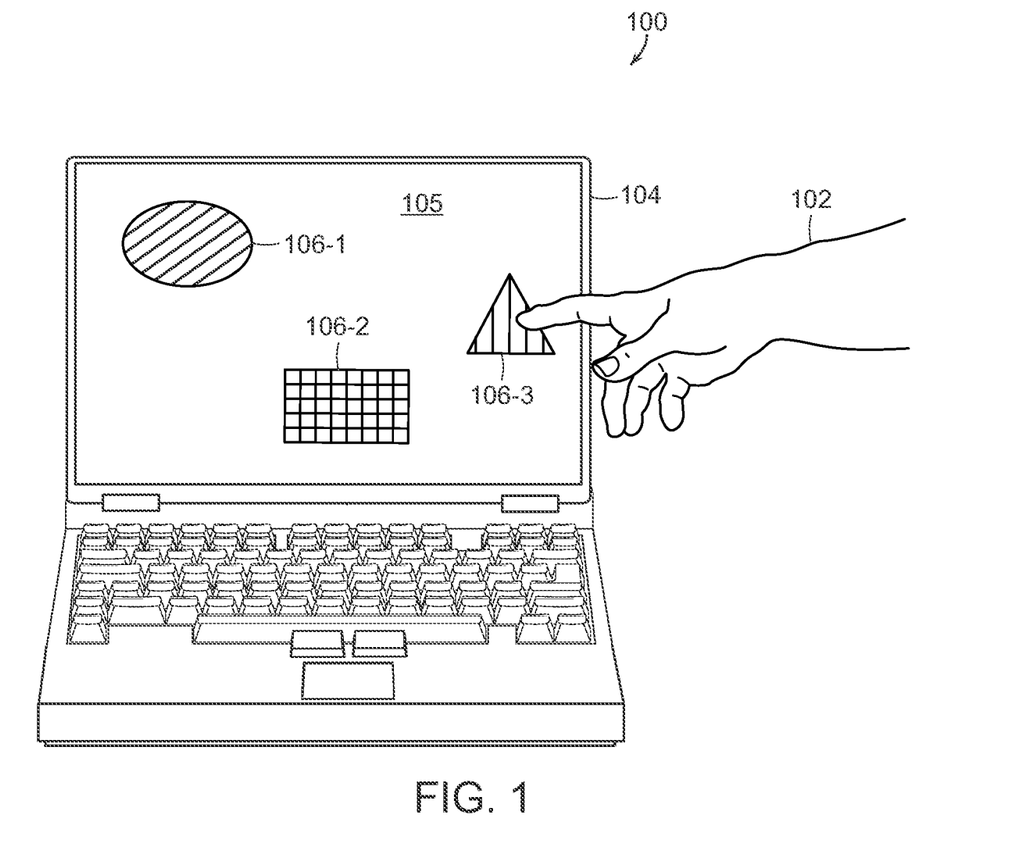
FIG. 1 is a representation of a known system with touch recognition.

As is known, many software applications and operating systems run on a hardware system 100, generally shown in FIG. 1, that allows for touch input from a user 102, usually via a touch-sensitive transparent screen or other device 104. Over the years, these have included, for example, video poker machines, ATMs, touch pads, etc. A Graphical User Interface (GUI) 105 with one or more target icons 106-x is usually presented to the user. When physically "touched" by the user, i.e., when the touch-sensitive screen, e.g., using capacitance or resistance, is touched adjacent an icon, the contact is detected. The "touched" icon is then identified, per pixel coordinates, for example, and a corresponding response is elicited from the software application.

The complexity of these touches has grown over time, from relatively simple "taps" or "clicks," to selecting and dragging components, swiping left or right, zooming in and out and other touch gestures. The "zooming" feature, with the proliferation of handheld devices, is often implemented by the user implementing a "pinch" gesture on the touch-sensitive screen.

An issue arises for older or legacy applications that may have no touch input recognition or minimal touch input recognition capabilities but are not programmed to recognize common, or more recently adopted, touch gestures, for example, the pinching gesture. While the applications could be modified, often there is no access to the source code and, even if it was available, each program would have to be modified and doing so is not an economically feasible option.

What is needed is a way to provide touch gesture recognition to legacy software applications.

SUMMARY OF THE INVENTION

In one aspect of the present disclosure, a method, in a system including a touch-sensitive display device and a computer, of implementing touch gesture recognition for a legacy software application, the computer comprising a processor and a tangible computer-readable medium storing a plurality of instructions executable by the processor to implement the method, comprises: initiating an instance of the legacy application including an application programming interface (API) associated therewith, the legacy application configured to respond to a predetermined set of input data; initiating an instance of an overlay application located over the legacy application and configured to detect, recognize and provide data regarding a touch gesture presented on the touch-sensitive device; and initiating a converter plug-in application, in communication with the legacy application API and the overlay application, configured to convert touch gesture data received from the overlay application into data found in the predetermined set of input data useable by the legacy application, wherein the legacy application is further configured to receive data from the converter plug-in application via the API, and wherein the overlay application is configured to intercept all touch data received from the touch-sensitive device.

In another aspect of the present disclosure, a tangible computer-readable storage medium having computer readable instructions stored therein that, when executed by a computer comprising a processor in a system including a touch-sensitive display device, cause the processor to execute a method of implementing touch gesture recognition for a legacy software application, the method comprising: initiating an instance of the legacy application including an application programming interface (API) associated therewith, the legacy application configured to respond to a predetermined set of input data; initiating an instance of an overlay application located over the legacy application and configured to detect, recognize and provide data regarding a touch gesture presented on the touch-sensitive device; and initiating a converter plug-in application, in communication with the legacy application API and the overlay application, configured to convert touch gesture data received from the overlay application into data found in the predetermined set of input data useable by the legacy application, wherein the legacy application is further configured to receive data from the converter plug-in application via the API, and wherein the overlay application is configured to intercept all touch data received from the touch-sensitive device.

In another aspect of the present disclosure, a system for implementing touch gesture recognition for a legacy software application comprises: a touch-sensitive display device; and a processor, coupled to the touch-sensitive display device. The processor is configured to: initiate an instance of the legacy application including an application programming interface (API) associated therewith, the legacy application configured to respond to a predetermined set of input data; initiate an instance of an overlay application located over the legacy application and configured to detect, recognize and provide data regarding a touch gesture presented on the touch-sensitive device; and initiate a converter plug-in application, in communication with the legacy application API and the overlay application, configured to convert touch gesture data received from the overlay application into data found in the predetermined set of input data useable by the legacy application, wherein the legacy application is further configured to receive data from the converter plug-in application via the API, and wherein the overlay application is configured to intercept all touch data received from the touch-sensitive device.

BRIEF DESCRIPTION OF THE DRAWINGS

Various aspects of the disclosure are discussed herein with reference to the accompanying Figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, however, not every component may be labeled in every drawing. The Figures are provided for the purposes of illustration and explanation and are not intended as a definition of the limits of the disclosure. In the Figures.

DETAILED DESCRIPTION

In the following detailed description, details are set forth in order to provide a thorough understanding of the aspects of the disclosure. It will be understood by those of ordinary skill in the art that these may be practiced without some of these specific details. In other instances, well-known methods, procedures, components and structures may not have been described in detail so as not to obscure the aspects of the disclosure.

It is to be understood that the present disclosure is not limited in its application to the details of construction and the arrangement of the components set forth in the following description or illustrated in the drawings as it is capable of implementations or of being practiced or carried out in various ways. Also, it is to be understood that the phraseology and terminology employed herein are for the purpose of description only and should not be regarded as limiting.

Certain features are, for clarity, described in the context of separate implementations, and may also be provided in combination in a single implementation. Conversely, various features, which are, for brevity, described in the context of a single implementation, may also be provided separately or in any suitable sub-combination.

As set forth above, generally, a legacy software application can only recognize or respond to the touches, if at all, that it was originally programmed to detect and, therefore, may not be capable of recognizing a touch "gesture" such as a pinch or a swipe. The legacy application may be able to detect and handle touch gestures, however, third-party developers are not able to reassign or change such handling in the legacy application due to the lack of an ability to modify the source code.

Advantageously, as will be described below, aspects of the present disclosure simplify the task of providing a touch gesture interface to work with a legacy application that otherwise would not respond to a touch gesture due to compatibility issues or lack of access to source code. Accordingly, developers and users benefit as the former can save time and costs while the latter can have a customized touch input experience. In addition, the touch gesture recognition is essentially transparent to the user and appears as if the legacy application itself is recognizing, and responding to, the gesture input. Thus the user can continue to use the legacy application without having to learn new commands.

Aspects of the present disclosure are explained with reference to a windowed operating system, for example, Windows from Microsoft. The implementations of the present disclosure, however, are not limited to use on such systems and could be run on other windowed systems, for example, MacOS and Linux.

Figure 2:
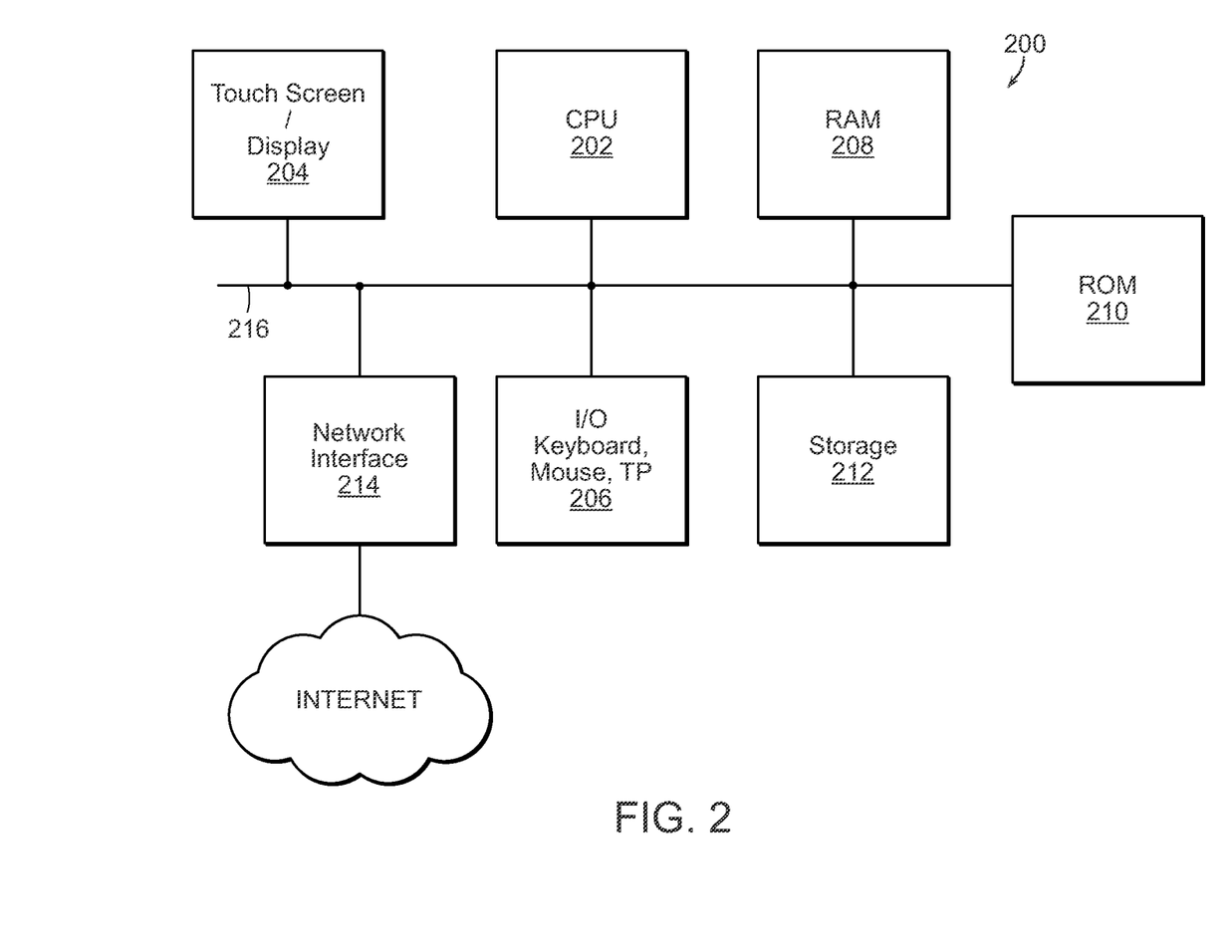
FIG. 2 is a functional block diagram of a system with touch recognition.

Referring now to FIG. 2, a system 200 running an aspect of the present disclosure may include a CPU 202, a touch-screen display terminal 204, a keyboard 206 or other I/O devices, RAM storage 208, ROM storage 210, a data storage device 212, for example, an SDD, and a Network Interface Device 214 to connect to the Internet, all connected via a local bus 216. Of course, one of ordinary skill in the art will understand that there may be other components that are not shown as they are not necessary to the aspects of the present disclosure described herein.

Figure 3:
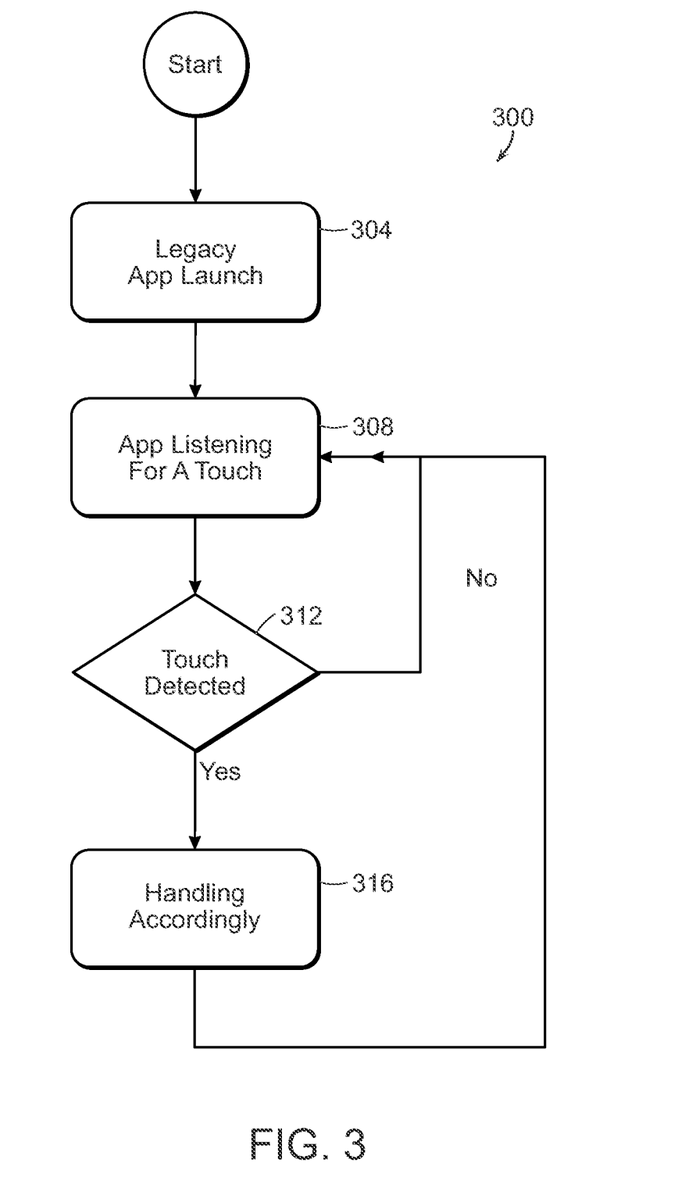
FIG. 3 is a flowchart of a method of a legacy application operating in response to a touch detection.

The legacy software application generally operates per a method 300, as shown in FIG. 3, where the application is initiated, i.e., launched, step 304, and which then "listens" for a touch to be detected, step 308. As known to those of ordinary skill in the art, this may be performed by waiting for an interrupt from the operating system. When a touch event is detected, step 312, the legacy application handles it accordingly, step 316. If no touch event is detected, then control passes from step 312 back to step 308 in a repeating loop, waiting for the next interrupt to handle a touch event.

As is known, many applications include, or make available, an application programming interface (API) to allow communication with the application. Generally, the API defines a protocol for communication that may allow, for example, different technologies to work together, regardless of language or platform. In one aspect of the present disclosure, referring now to FIG. 4, a legacy application 402 includes an API 404. A converter plug-in software application 406, described in more detail below, communicates with the API 404 and a touch-gesture recognition overlay software application 408, also as will be described below, communicates with the plug-in application 406.

Figure 4:
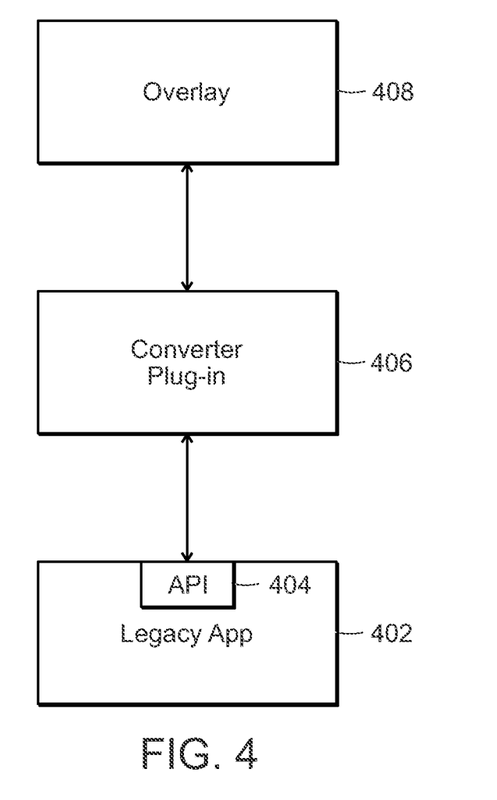
FIG. 4 is a block diagram of an aspect of the present disclosure.

The touch-gesture recognition overlay application 408 includes a touch gesture recognition engine, as is known in the art, that interacts with the touch-sensitive device 204 to identify when a touch gesture has been made by the user. Accordingly, when a touch gesture is identified, for example, a pinch motion, data regarding the gesture is generated. This generated data may include, for example, the type of gesture and its location on the screen.

In order for the touch-gesture recognition overlay application 408 to "intercept" a touch gesture before the legacy application 402, the overlay application must be "above," i.e., have priority over, the legacy application 402. The overlay application is "in focus" with regard to touch input and always on top as a system level application in that it will always have priority over any other application that might be opened. All touch inputs in the space of the overlay, therefore, will then go to the overlay and onto the legacy application, via the plug-in application, with which the overlay application is networked. In a windowed operating system, the application window that is "on top" is the active window and inputs and outputs are directed to and from it. This is familiar to many users where the desired application window is brought to the front of all of the others when it is accessed.

Figure 5:
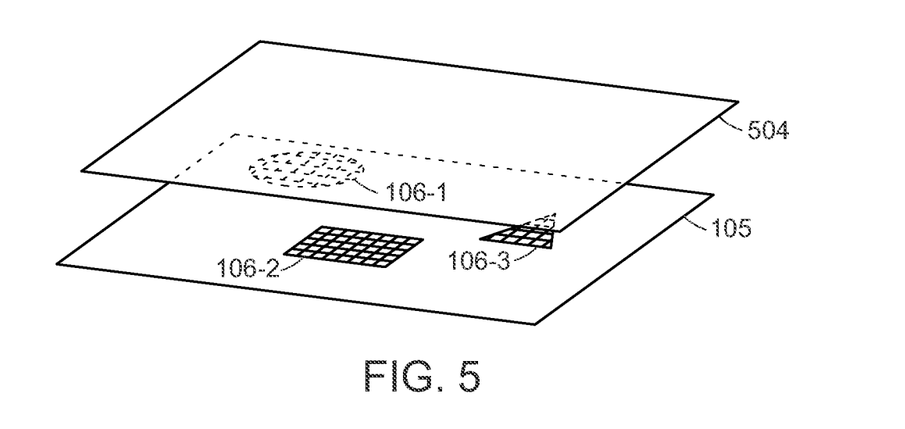
FIG. 5 is a conceptual representation of an overlay presented over a legacy application.

As users have experienced, however, when one window is brought to the front, it blocks the other application windows. As aspects of the present disclosure are meant to be unnoticed by the user, i.e., the legacy application should look the same, a window for the touch-gesture recognition overlay application 408 should not "block," or otherwise impair, the user's interaction with, or viewing of, the legacy application. It was understood by the inventors that a totally transparent window would not be recognized by the operating system and, therefore, would not be able to intercept the gesture. Accordingly, a window 504 for the touch-gesture recognition overlay application 408 is configured with a slightly opaque characteristic, in one approach, an alpha value of the pixels in the window is increased by one step above being totally transparent, over the GUI 105, as represented in FIG. 5. Advantageously, a user would most likely not notice this additional window over the legacy application, especially where the underlying legacy application has significantly changing or active graphics.

Further, the overlay application follows the sizing of the legacy application thus, for example, if the legacy application is not "full screen," then the overlay application would also not be "full screen." In addition, if the legacy application moves, the overlay application will follow and intercept touches in that area. Alternatively, the overlay application could be configured to intercept all touch gestures based on the assumption that the legacy application is "full screen" all the time. Still further, the overlay application can be configured to be over a portion, i.e., less than an entirety, of the legacy application.

Referring back to FIG. 4, when the overlay application 408 detects a gesture, the data regarding the detected gesture is sent to the plug-in application 406. In one approach, the data is sent using the known JSON (JavaScript Object Notation) data-interchange format although any format or protocol can be implemented as understood by those of ordinary skill in the art.

The plug-in application 406 is configured to receive the touch gesture data from the overlay application 408. This data, however, cannot be directly used by the legacy application as it does not recognize gestures. Accordingly, the plug-in application 406 converts the gesture data to commands that can be recognized by the legacy application 402. This conversion may be accomplished by any one of a number of well-understood approaches, for example, a look-up table, a conversion algorithm, etc. One example would be where the legacy application supports a mouse scroll wheel for zooming in and out but does not support the pinching gesture. In that situation, the recognized pinching gesture could be converted to a scroll wheel action that the legacy application recognizes.

Figure 6:
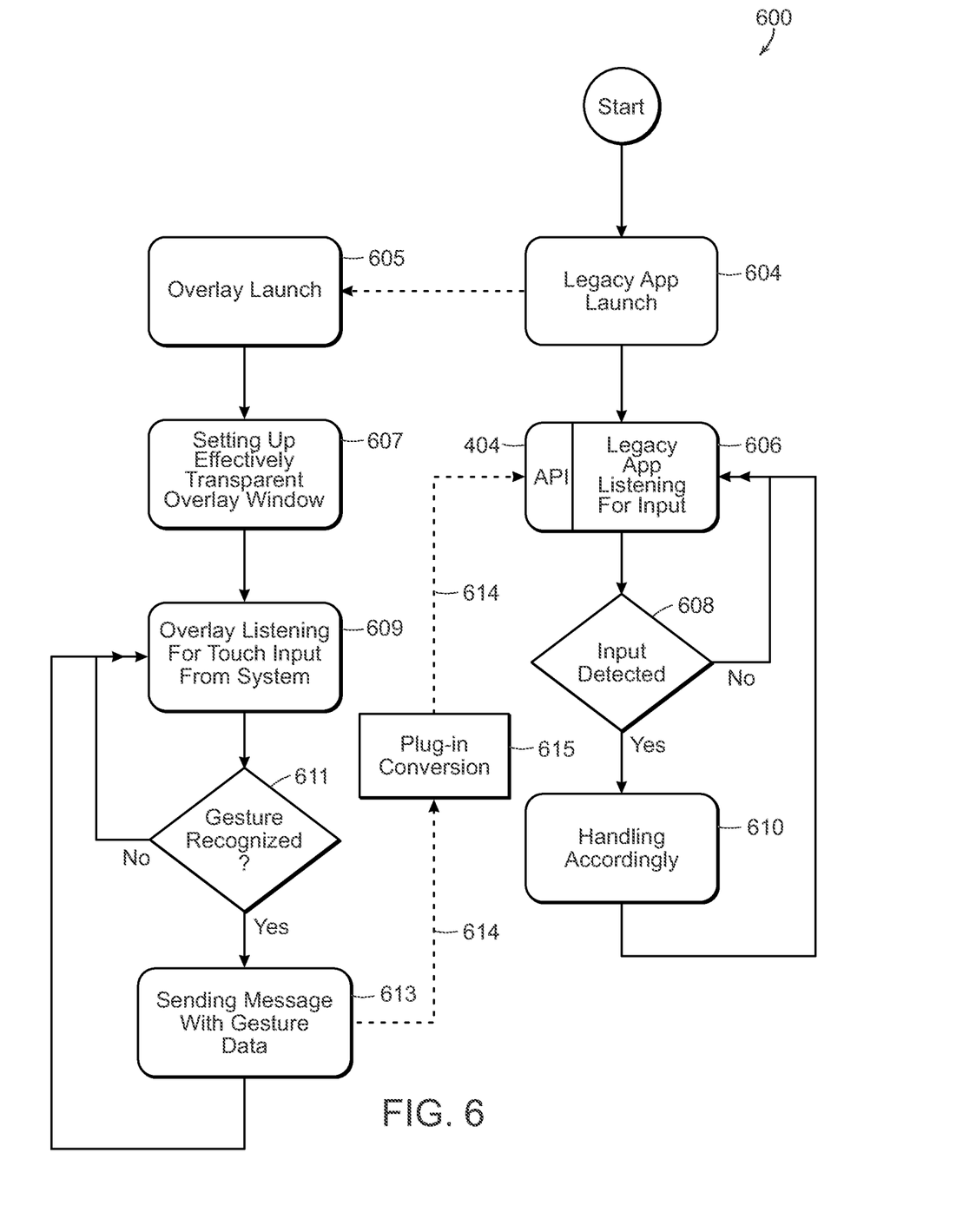
FIG. 6 is a flowchart of a method in accordance with an aspect of the present disclosure.

Referring now to FIG. 6, a method 600 of providing the legacy application with touch gesture recognition includes launching the legacy application, step 604, and launching the overlay application, step 605, and setting up the effectively transparent overlay window, step 607, as described herein. Subsequently, the legacy application is waiting or listening for input information, step 606. Concurrently, step 609, the overlay application is listening for touches, i.e., waiting to intercept touches and gestures.

If a gesture is recognized, step 611, the information or data related to the detected gesture is sent, step 613, to the converter plug-in application that then converts, step 615, the gesture data to data that would be acceptable to the legacy API. In one approach, when a gesture is recognized, a message is composed in the JSON format, and sent over 614 to the plug-in application via, for example, UDP (User Datagram Protocol) or TCP/IP (Transmission Control Protocol/Internet Protocol) network sockets, although other protocols could be used.

At step 606, the legacy application is continuing to operate and respond, when necessary, to input. If a touch is detected, i.e., received via the API, step 608, control passes to step 610 and handled accordingly.

The plug-in application and/or the overlap application can be written in C++ or any other programming language and, in one approach, leverages the Windows WM_POINTER system API to process touch input, for example, if a touch is up, down or updating. One of ordinary skill in the art will understand how the teachings set forth herein could be extended to other operating systems.

It should be noted that if the converter plugin 406 receives data for a gesture that does not translate into commands for the legacy application, then no touch data will be passed along, i.e., no effect will take place.

Advantageously, the architecture shown in FIG. 4, provides the flexibility of gesture recognition to legacy applications that do not have such capacity by providing a distributed approach to application touch input processing. The architecture, overrides the legacy application's touch-based input processing, if any is already programmed, without needing to modify its existing input code. The plug-in and overlay applications can be repurposed for most applications as long as an application allows user-defined plug-ins that, in turn, allow for, i.e., support, inter-application communication via, in one non-limiting example, a socket protocol, as is understood by one of ordinary skill in the art. The overlay and plug-in applications can also support multiple simultaneous gestures from multiple users.

Advantageously, where a legacy application already recognizes a touch gesture with a specific response, aspects of the present disclosure allow for the "re-mapping" of this response. For example, if a legacy application already recognizes a "pinch gesture" with a first response but it is desired that a second response be implemented instead, then the "pinch gesture" would be intercepted by the overlay application and the commands then received by the legacy application, via the plug-in conversion, would result in the desired second response.

Various aspects of the above-described systems and methods may be implemented in digital electronic circuitry, in computer hardware, firmware, and/or software. The implementation can be, for example, a computer program product, i.e., a computer program embodied in a tangible information carrier, a machine-readable storage device to control the operation of data processing apparatus or a programmable processor, a computer and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

While the above-described aspects generally depict a computer implemented system employing at least one processor executing program steps out of at least one memory to obtain the functions herein described, it should be recognized that the presently described methods may be implemented via the use of software, firmware or alternatively, implemented as a dedicated hardware solution such as in a field programmable gate array (FPGA) or an application specific integrated circuit (ASIC) or via any other custom hardware implementation.

It is to be understood that the present disclosure has been described using non-limiting detailed descriptions of aspects thereof that are provided by way of example only and are not intended to limit the scope of the disclosure. Features and/or steps described with respect to one aspect may be used with other aspects and not all aspects of the disclosure have all of the features and/or steps shown in a particular figure or described with respect to one of the aspects. Variations of aspects described will occur to persons of skill in the art.

It should be noted that some of the above described aspects include structure, acts or details of structures and acts that may not be essential to the disclosure and which are described as examples. Structure and/or acts described herein are replaceable by equivalents that perform the same function, even if the structure or acts are different, as known in the art, e.g., the use of multiple dedicated devices to carry out at least some of the functions described as being carried out by the processor of the present disclosure. Therefore, the scope of the disclosure is limited only by the elements and limitations as used in the claims.

Whereas many alterations and modifications of the disclosure will no doubt become apparent to a person of ordinary skill in the art after having read the foregoing description, it is to be understood that the particular aspects shown and described by way of illustration are in no way intended to be considered limiting. Further, the subject matter has been described with reference to particular aspects, but variations within the spirit and scope of the disclosure will occur to those skilled in the art. It is noted that the foregoing examples have been provided merely for the purpose of explanation and are in no way to be construed as limiting of the present disclosure.

Although the present disclosure has been described herein with reference to particular means, materials and aspects, the present disclosure is not intended to be limited to the particulars disclosed herein; rather, the present disclosure extends to all functionally equivalent structures, methods and uses, such as are within the scope of the appended claims. Various modifications and changes may be made to the disclosed implementations by persons skilled in the art without departing from the scope of the present disclosure.

What is claimed is:

1. A method, in a system including a touch-sensitive display device and a computer, of implementing touch gesture recognition for a legacy software application, the computer comprising a processor and a tangible computer-readable medium storing a plurality of instructions executable by the processor to implement the method, comprising:
    initiating an instance of the legacy application including an application programming interface (API) associated therewith, the legacy application configured to respond to a predetermined set of input data;
    initiating an instance of an overlay application located over the legacy application and configured to detect, recognize and provide data regarding a touch gesture presented on the touch-sensitive device; and
    initiating a converter plug-in application, in communication with the legacy application API and the overlay application, configured to convert touch gesture data received from the overlay application into data found in the predetermined set of input data useable by the legacy application,
    wherein the legacy application is further configured to receive data from the converter plug-in application via the API, and
    wherein the overlay application is configured to intercept all touch data received from the touch-sensitive device.

2. The method of claim 1, further comprising:
    initiating the instance of the overlay application to be located over at least a portion of the legacy application.

3. The method of claim 1, further comprising:
    the overlay application and the converter plug-in application communicating with one another over a network protocol.

4. The method of claim 1, wherein converting touch gesture data received from the overlay application into data found in the predetermined set of touch input data further comprises:
    accessing a conversion look-up table mapping gesture information with predetermined corresponding legacy application input data.

5. The method of claim 1, further comprising:
    running a windowed operating system;
    initiating the legacy application, the overlay application and the plug-in application in the windowed operating system; and
    initiating the overlay application to run at a higher priority than the legacy application.

6. The method of claim 5, further comprising:
    displaying a GUI of the legacy application on the display device;
    displaying a GUI of the overlay application positioned over the legacy application GUI; and
    setting a display characteristic of the overlay application GUI such that the legacy application is visible.

7. The method of claim 6, wherein setting the display characteristic of the overlay application GUI further comprises:
    setting an alpha value of pixels in the overlay application GUI at a value one step above total transparency.

8. A tangible computer-readable storage medium having computer readable instructions stored therein that, when executed by a computer comprising a processor in a system including a touch-sensitive display device, cause the processor to execute a method of implementing touch gesture recognition for a legacy software application, the method comprising:
    initiating an instance of the legacy application including an application programming interface (API) associated therewith, the legacy application configured to respond to a predetermined set of input data;
    initiating an instance of an overlay application located over the legacy application and configured to detect, recognize and provide data regarding a touch gesture presented on the touch-sensitive device; and
    initiating a converter plug-in application, in communication with the legacy application API and the overlay application, configured to convert touch gesture data received from the overlay application into data found in the predetermined set of input data useable by the legacy application,
    wherein the legacy application is further configured to receive data from the converter plug-in application via the API, and
    wherein the overlay application is configured to intercept all touch data received from the touch-sensitive device.

9. The tangible computer-readable storage medium of claim 8, the method further comprising:
    initiating the instance of the overlay application to be located over at least a portion of the legacy application.

10. The tangible computer-readable storage medium of claim 8, the method further comprising:
    the overlay application and the converter plug-in application communicating with one another over a network protocol.

11. The tangible computer-readable storage medium of claim 8, wherein converting touch gesture data received from the overlay application into data found in the predetermined set of touch input data further comprises:
    accessing a conversion look-up table mapping gesture information with predetermined corresponding legacy application input data.

12. The tangible computer-readable storage medium of claim 8, the method further comprising:
running a windowed operating system;
initiating the legacy application, the overlay application and the plug-in application in the windowed operating system; and
initiating the overlay application to run at a higher priority than the legacy application.

13. The tangible computer-readable storage medium of claim 12, the method further comprising:
displaying a GUI of the legacy application on the display device;
displaying a GUI of the overlay application positioned over the legacy application GUI; and
setting a display characteristic of the overlay application GUI such that the legacy application is visible.

14. The tangible computer-readable storage medium of claim 13, wherein setting the display characteristic of the overlay application GUI further comprises:
setting an alpha value of pixels in the overlay application GUI at a value one step above total transparency.

15. A system for implementing touch gesture recognition for a legacy software application, comprising:
a touch-sensitive display device; and
a processor, coupled to the touch-sensitive display device, configured to:
initiate an instance of the legacy application including an application programming interface (API) associated therewith, the legacy application configured to respond to a predetermined set of input data;
initiate an instance of an overlay application located over the legacy application and configured to detect, recognize and provide data regarding a touch gesture presented on the touch-sensitive device; and
initiate a converter plug-in application, in communication with the legacy application API and the overlay application, configured to convert touch gesture data received from the overlay application into data found in the predetermined set of input data useable by the legacy application,
wherein the legacy application is further configured to receive data from the converter plug-in application via the API, and
wherein the overlay application is configured to intercept all touch data received from the touch-sensitive device.

16. The system of claim 15, wherein the processor is further configured to:
initiate the instance of the overlay application to be located over at least a portion of the legacy application.

17. The system of claim 15, wherein the processor is further configured to:
set the overlay application and the converter plug-in application to communicate with one another over a network protocol.

18. The system of claim 15, wherein the processor is further configured to:
access a conversion look-up table mapping gesture information with predetermined corresponding legacy application input data when converting touch gesture data received from the overlay application into data found in the predetermined set of touch input data.

19. The system of claim 15, wherein the processor is further configured to:
run a windowed operating system;
initiate the legacy application, the overlay application and the plug-in application in the windowed operating system; and
initiate the overlay application to run at a higher priority than the legacy application.

20. The system of claim 19, wherein the processor is further configured to:
display a GUI of the legacy application on the display device;
display a GUI of the overlay application positioned over the legacy application GUI; and
set a display characteristic of the overlay application GUI such that the legacy application is visible.

* * * * *